United States Patent Office 3,419,753
Patented Dec. 31, 1968

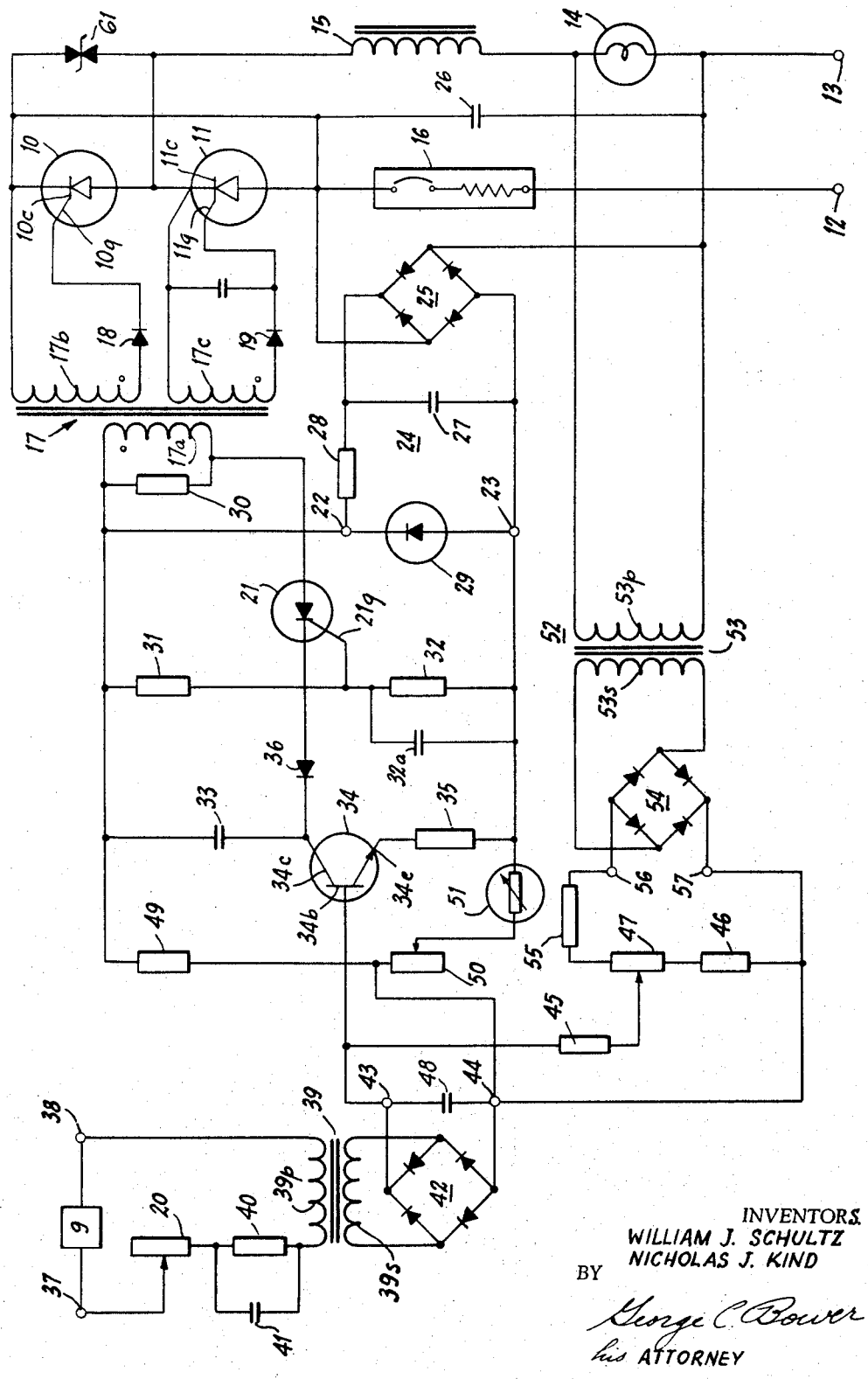

3,419,753
SOLID STATE DIMMER CONTROL CIRCUIT
William J. Schultz and Nicholas J. Kind, Yonkers, N.Y.,
assignors to Ward Leonard Electric Co., Mount Vernon,
N.Y., a corporation of New York
Filed June 30, 1966, Ser. No. 561,830
6 Claims. (Cl. 315—194)

ABSTRACT OF THE DISCLOSURE

Silicon controlled rectifiers have the gating circuits connected to an input circuit with a transistor in series with the resistor capacitor circuit for controlling the phase relation of the alternating load current passing through the silicon controlled rectifiers by varying the phase relation between the initiating pulses applied by the control circuit and the load current. The input circuit is connected to a signal source having direct current output with a ripple. The amplitude of the ripple varies with the amount of the D.C. component and a variable potentiometer is provided to adjust the amount of control signal applied to a transformer for excluding the direct current and passing the controlled ripple to the transistor for adjusting the phase relation between the initiating current and the load current.

---

This invention relates to solid state controlled rectifier systems for varying the intensity of illumination of incandescent lamps from full brilliance to blackout. The invention is directed particularly to a control circuit utilizing solid state devices to vary the firing time of the solid state controlled rectifiers.

Although solid state control circuits have been used as dimmers for varying the intensity of illumination of incandescent lamps, difficulties have been encountered when a plurality of circuits are connected to a common source of control current, and when a plurality of dimmers are connected to a common single phase power source or a three-phase power source. The individual circuits may not function independently of one another. Transistors are highly sensitive to transient signals. Transient inputs from other control circuits or other solid state controlled rectifier systems may operate the transistors, activating a dimmer which otherwise would be in the off condition. Further, tracking of one control circuit by another may occur. It is, therefore, desirable to suppress transient signals to other control circuits so that a given control circuit is responsive only to the signal intended to operate that particular circuit.

An object of the invention is to provide a solid state control circuit that is responsive only to the signal intended to operate that circuit.

Another object of the invention is to provided a transistor type control circuit which is isolated from the inputs of other control circuits.

Another object of the invention is to provide a transistor type control circuit, isolated from the input signals of other control circuits, for varying the illumination of an incandescent lamp load in accordance with a square law relationship.

Other and further objects and advantages will be apparent from the following description taken in connection with the drawing.

The silicon controlled rectifiers 10 and 11 are connected in parallel inverse relation to alternately pass a load current supplied by an alternating current source connected to the input terminals 12 and 13. The load current passes through the incandescent lamp load 14, inductor 15 and the circuit breaker 16. The initiation of the conductivity of the silicon controlled rectifiers 10 and 11 may be varied over each half cycle by the initiating pulses from the secondary windings 17b, 17c of the transformer 17. The amount of load current passed by the lamp load 14 may be varied to change the intensity of illumination from full brilliance to blackout.

The inductor 15 functions as a choke to suppress the sharp current rise through the silicon controlled rectifiers to eliminate radio frequency interference and to provide protective means for preventing a rapid rise in current through the rectifiers in case of a short circuit or overloading of the output.

The circuit breaker 16 provides means for disconnecting the rectifiers on a sustained overload. The inductor 15 may or may not be utilized, depending upon the operating conditions.

The silicon controlled rectifiers 10, 11 are provided with initiating pulses by the secondary windings 17b and 17c of the transformer 17 to alternately fire the rectifiers. The windings 17b and 17c are connected across the gate 10g and the cathode 10c of the rectifier 10 and the gate 11g and cathode 11c of the rectifier 11, respectively, with the silicon diodes 18, 19 in series therewith to prevent a negative signal from being applied to the rectifiers. When a surge of current passes through the primary windings 17a, initiating pulses are created across the secondary windings 17b and 17c. The phase relation of the initiating pulse and the load current is controlled by the control signal applied to terminals 37, 38 from source 9 connected thereto. This phase may be varied over nearly 180° of a respective half cycle. Thus a full range of load current is attained. The current through the primary winding 17a is dependent on the conductivity of the silicon controlled rectifier 21 connected in series with the winding 17a. A transient suppressor 61 is connected across the silicon controlled rectifiers 10 and 11 to absorb surge currents.

A regulated clipped wave unfiltered voltage is provided at the terminals 22 and 23 of the rectifying circuit 24. The rectifying circuit 24 has a full wave bridge rectifier 25 connected directly to the alternating input terminal 13 and to the input terminal 12 through the circuit breaker 16. The output of the rectifier 25 is connected to the terminals 22, 23. The single anode Zener 29 is connected across the terminals to limit the output to a given value so that the rectified ouput comprises half cycle pulses of voltage that are substantially constant for the entire half cycle. The terminal 23 is negative. The capacitors 26 and 27 along with the resistor 30 connected across the winding 17a prevent output voltage oscillations at light load levels when the inductor 15 is not connected in the output circuit and also suppress transient signals to the control circuit.

The silicon controlled rectifier 21 has the gate 21g connected between the resistors 31 and 32. These resistors are connected in series across the direct current supply terminals 22 and 23 for application of the constant pulse voltage thereacross to apply a given positive voltage to the gate 21g. A capacitor 32a is connected across the resistor 32. A capacitor 33, transistor 34 and resistor 35 are connected in series across the supply terminals 22 and 23. The constant pulse voltage is applied on each half cycle to charge the capacitor. The transistor 34 varies the rate of charging of the capacitor 33 by the variation of the conductivity of the transistor. When the voltage across the capacitor 33 reaches a given value, the firing voltage on the gate 21g is reached and the silicon controlled rectifier fires providing a current path through the winding 17a, silicon rectifier 21, blocking diode rectifier 36, transistor 34 and resistor 35. The capacitor 33 also discharges through the winding 17a, silicon controlled rectifier 21 and rectifier 36. The surge of current through the winding 17a produces the initiating pulses in the windings 17b and 17c.

The transistor 34 is of the NPN type with the collector 34c and emitter 34e connected in series with the capacitor 33 and resistor 35. The conductivity of the transistor 34 is varied by the control signal applied to the control input terminals 37, 38. A conventional low voltage variable source 9 provides a rectified full wave unfiltered high ripple content control signal to terminals 37, 38.

The rheostat 20 sets the magnitude of the signal applied to the primary winding 39p of the transformer 39 and at the same time sets the magnitude of the output current of the silicon controlled rectifiers 10, 11 when maximum control signal is applied to terminals 37, 38. The amplitude of the ripple varies proportionally to the magnitude of the signal applied to the terminals 37, 38. The resistor 40 has a high resistance to the direct current component of the control signal. Capacitor 41 connected across the resistor 40 provides a low impedance path for the ripple of the control signal.

The transformer 39 passes the ripple portion of the signal to the secondary winding 39s but isolates the winding 39s from the direct current portion. Thus the transistor circuit is connected to the input signal solely by a flux. The secondary winding 39s is connected across the full wave bridge rectifier 42. The ripple is rectified to a direct current signal applied across the terminals 43 and 44 and filtered by capacitor 48.

The resistor 49, rheostat 50 and thermistor 51 are connected across the constant pulsating voltage terminals 22, 23. The rheostat 50 sets the bias on the transistor 34 so that the illumination is reduced to blackout when minimum control signal is applied to terminals 37, 38. The thermistor 51 compensates for the change in emitter resistance due to molecular action within the transistor 34 and due to ambient temperature changes. This compensation prevents voltage drift.

A feedback circuit 52 is provided comprising a transformer 53 having the primary 53p connected across the incandescent lamp load 14 and a secondary 53s connected across the full wave bridge rectifier 54. The resistor 55, potentiometer 47 and resistor 46 are connected across the output terminals 56 and 57 of the bridge rectifier 54. Potentiometer 47 is used to set the magnitude of the feedback signal applied to the terminals 43, 44 which is then electrically mixed with the signal from rectifier 42 to provide proper output voltage characteristics. The common terminals 44 and 57 are of opposite polarity with the terminal 44 being negative and the terminal 57 being positive.

As seen from the foregoing description the transistor 34 by its variation in conductivity can vary the phase relation between the initiating pulses of the secondary windings 17b and 17c and the load current passing through the silicon controlled rectifiers 10 and 11 nearly over an entire half cycle. Thus by varying the control signal applied to terminals 37, 38 the lamp illumination can be made to vary from blackout to full brilliance.

The resistor 50 provides a bias control which sets the blackout condition of the lamps 14 when the magnitude of the control signal applied to the terminals 37, 38 is at a minimum. Thus the lights are immediately responsive to an increase in the magnitude of the applied control signal. Further, the feedback circuit 52 provides a signal back to mix with the signal from the rectifier 40 so that linear variation of the control signal applied to terminals 37, 38 will produce a change in illumination of the lamps 14 following a square law relationship.

The particular feature of this apparatus is the utilization of a solid state means, such as a transistor 34, to control the phase relation between the initiating pulses and the load current without being affected by the direct current component of the control signal applied to the input signal terminals 37 and 38. The transformer 39 provides means for isolating the transistor 34 from the direct current component input while varying the conductivity of the transistor 34 by changes in amplitude of the ripple on the direct current component. As previously mentioned, the amplitude of this ripple is proportional to the magnitude of the direct current component. This means that the application of a linear control signal at terminals 37, 38 will be reflected in linear variations in the amplitude of the ripple. Thus the direct current signal across the terminals 43 and 44 will correspond to the ripple component of the applied control signal. This isolation from the direct current component is particularly important when a plurality of control units are operated from a common control supply. Sometimes the signals of other control units are reflected through this supply system to cause other units to be activated and follow the control adjustments of the other units. This isolation of the transistor 34 permits the use of multiple circuits and thus the use of these control units in extensive dimming systems.

It is understood a transistor type of circuit is less expensive than other types of dimming units due to the relatively few parts required and the inexpensiveness of transistors. As illustrated in the drawing, the number of parts are at a minimum and, except for the transformers 17, 39 and 52, are resistors, capacitors, rectifiers and a silicon controlled rectifier. Thus the control device can be manufactured at a relatively low cost and provide an operation comparable to more expensive dimming units.

Various modifications may be made in the control device without departing from the invention as set forth in the appended claims.

We claim:

1. Apparatus for controlling alternating load current supplied to an incandescent lamp load to vary the illumination thereof comprising solid state controlled means for passing alternating load current to an incandescent lamp load, a control circuit having signal input means for connection to a source providing a signal with a direct current component and a ripple and having initiating pulse applying means connected to said solid state controlled means, said control circuit having solid state means for varying the phase relation between initiating pulses and load current over said initiating pulse applying means connected to said solid state controlled means and having a control signal applying means connected between said signal input means and said solid state means to isolate said solid state means from a direct current component and impress an adjustable rectified control signal from a ripple on the direct current component to control the operation of said solid state means free of direct current component.

2. Apparatus as set forth in claim 1 wherein said control signal applying means connected between said signal input means and said solid state means has flux coupling means for transferring a ripple on a direct current component and isolating a direct current component from said solid state means.

3. Apparatus as set forth in claim 2 wherein said flux coupling means is a transformer.

4. Apparatus for controlling alternating load current supplied to an incandescent lamp load to vary the illumination thereof comprising solid state controlled means for passing alternating load current to an incandescent lamp load, firing means connected to said solid state controlled means for impressing initiating pulses thereon in variable phase relation with an alternating load current passing through said solid state controlled means, a solid state controlled rectifier connected to said firing means for passing current therethrough to create initiating pulses, a series connected resistor capacitor transistor charging circuit with the charging current through said capacitor controlled by the conductivity of said transistor, said circuit capacitor coupled across said solid state controlled rectifier and said firing means for rendering said solid state controlled rectifier conductive to pass current through said firing means, an input circuit connected to said transistor for coupling said transistor to a control source supplying a direct current with a ripple varying in amplitude in proportion to the variation of magnitude of the direct current, said input circuit having means for solely passing a ripple on a control current to vary the conductivity of said transistor and thereby the phase relation of initiating pulses and load current to adjust the level of illumination of the incandescent lamp load.

5. Apparatus as set forth in claim 4 wherein a feedback circuit is provided and connected between the output of said solid state controlled rectifiers and the input of said transistor to impart a square law relationship between the variation of the illumination of said lamp load and the magnitude of the direct current.

6. Apparatus as set forth in claim 4 wherein said means for solely passing a ripple in a controlled current comprises a transformer.

References Cited

UNITED STATES PATENTS

| 3,317,788 | 5/1927 | Locklin | 315—194 |
| 3,243,653 | 3/1966 | Locklin | 315—194 |
| 3,323,014 | 5/1966 | West | 315—194 |

JOHN W. HUCKERT, *Primary Examiner.*

J. D. CRAIG, *Assistant Examiner.*

U.S. Cl. X.R.

315—224, 199